US010245679B2

(12) United States Patent
Kobayashi et al.

(10) Patent No.: US 10,245,679 B2
(45) Date of Patent: Apr. 2, 2019

(54) LASER WELDING HEAD

(71) Applicant: Kabushiki Kaisha Toshiba, Minato-ku (JP)

(72) Inventors: Taiji Kobayashi, Yokohama (JP); Masataka Tamura, Yokohama (JP); Takeshi Maehara, Yokohama (JP); Osamu Yamaguchi, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 241 days.

(21) Appl. No.: 15/086,687

(22) Filed: Mar. 31, 2016

(65) Prior Publication Data

US 2016/0288260 A1 Oct. 6, 2016

(30) Foreign Application Priority Data

Apr. 2, 2015 (JP) ................................. 2015-075980

(51) Int. Cl.
*B23K 26/12* (2014.01)
*B23K 26/14* (2014.01)
*B23K 26/211* (2014.01)

(52) U.S. Cl.
CPC ............ *B23K 26/211* (2015.10); *B23K 26/12* (2013.01); *B23K 26/14* (2013.01); *B23K 26/1464* (2013.01)

(58) Field of Classification Search
CPC .. B23K 26/211; B23K 26/1464; B23K 26/12; B23K 26/14
USPC ....... 219/119, 121.6, 121.78, 121.84, 137.61
See application file for complete search history.

(56) References Cited

U.S. PATENT DOCUMENTS

| 4,471,017 | A | * | 9/1984 | Poeschel | ................... | C23C 4/02 |
| | | | | | | 123/193.5 |
| 4,947,024 | A | * | 8/1990 | Anderson | .............. | B23K 9/123 |
| | | | | | | 219/137 R |
| 5,408,065 | A | * | 4/1995 | Campbell | .......... | B23K 26/0884 |
| | | | | | | 219/121.6 |
| 2006/0078738 | A1 | * | 4/2006 | Goto | ........................ | B23K 9/26 |
| | | | | | | 428/409 |
| 2010/0187209 | A1 | | 7/2010 | Miyazaki et al. | | |

FOREIGN PATENT DOCUMENTS

| CN | 203712095 U | | 7/2014 |
| DE | 196 27 803 C1 | | 10/1997 |
| EP | 1 629 924 A1 | | 3/2006 |
| JP | 61-296969 A | | 12/1986 |
| JP | S63-33188 A | | 2/1988 |
| JP | 01234515 A | * | 9/1989 |
| JP | 5-212571 A | | 8/1993 |

(Continued)

OTHER PUBLICATIONS

Extended European Search Report dated Jul. 19, 2016 in European Patent Application No. 16162858.1.

*Primary Examiner* — Thien S Tran
(74) *Attorney, Agent, or Firm* — Oblon, McClelland, Maier & Neustadt, L.L.P.

(57) ABSTRACT

A laser welding head includes a shield gas injection nozzle and welding wire supply nozzle, wherein the shield gas injection nozzle and the welding wire supply nozzle include a main body section and a surface layer section that covers the main body section, and at least part of the surface layer section is formed by at least one of ultra-hard alloy, cermet and ceramics.

12 Claims, 4 Drawing Sheets

(56) References Cited

FOREIGN PATENT DOCUMENTS

| | | | |
|---|---|---|---|
| JP | 4930594 | B2 | 2/2012 |
| JP | 2012-110945 | A | 6/2012 |
| JP | 2014-87809 | A | 5/2014 |
| JP | 2014087809 | A * | 5/2014 |
| JP | 2014-128832 | | 7/2014 |
| WO | WO2004/108338 | A1 | 12/2004 |

* cited by examiner

LASER WELDING HEAD

CROSS-REFERENCE TO RELATED APPLICATION

This application is based upon and claims the benefit of priority from Japanese Patent Application No. 2015-075980, filed on Apr. 2, 2015, the entire contents of which are incorporated herein by reference.

BACKGROUND

Field

Embodiments of the present invention relate to a laser welding head.

Related Art

When repair work is performed in a nuclear reactor, there is a place such as a narrow place which is difficult to access in the nuclear reactor. In order to increase the accessibility, a laser welding apparatus, which has small heat input and which can be made small in size, has been developed. As for a laser welding head for laser welding work to repair a nuclear reactor, various configurations have been proposed to reduce damage of the laser welding head, the damage being caused by the reflected light from a base material and the radiant heat from the molten pool.

As configurations adopted to reduce thermal damage of the laser welding head, there are proposed an underwater welding apparatus, an overlay welding apparatus, an overlay welding method for a reactor internal structure in a nuclear reactor, and the like. The proposed underwater welding apparatus includes the laser welding head configured by an aluminum alloy or a copper alloy having high thermal conductivity and therefore improves mechanical and thermal durability.

Further, in the proposed overlay welding apparatus, when the flow rate of the shielding gas is set to 6 to 14 m/s at the outlet of the shield gas injection nozzle, the proposed overlay welding apparatus recesses the surface of the molten pool and can thereby irradiate at a position closer to the base material. As a result, since welding penetration depth is increased, the proposed overlay welding apparatus can suppress occurrence of a fusion defect and a weld crack without increasing the amount of heat input.

In the overlay welding method described above, if the distance between the outlet of the shield gas injection nozzle and the molten pool is increased, the flow rate of the shielding gas is reduced, and the effect of increasing the welding penetration depth is therefore reduced. Accordingly, in the overlay welding method described above, it is required that the laser welding work is performed in a state where the shield gas injection nozzle is arranged close to the molten pool. In the state where the shield gas injection nozzle is arranged close to the molten pool, it is necessarily required that a welding wire supply nozzle which supplies a welding wire to the target is arranged close to the molten pool.

The laser light which is irradiated from the shield gas injection nozzle onto a target such as the base material is reflected by the target, and then returned to a portion of the shield gas injection nozzle and/or the welding wire supply nozzle. If the shield gas injection nozzle is arranged close to the molten pool, the influence of the reflected light on the shield gas injection nozzle and welding wire supply nozzle become large. Accordingly, there arises an event that the welding head (including the shield gas injection nozzle and the welding wire supply nozzle) is damaged by melting, deformation, deficiency or the like, and the damage should be therefore prevented.

The embodiments according to the present invention was made in consideration of the circumstances mentioned above and an object thereof is an object to provide a laser welding head capable of reducing the influence of the reflected light.

In consideration of the circumstances described above, a laser welding head in accordance with the embodiments according to the present invention includes: a shield gas injection nozzle that irradiates laser light onto a target and supplies a shielding gas to the target; and a welding wire supply nozzle that supplies a welding wire to the target, wherein the shield gas injection nozzle and the welding wire supply nozzle include a main body section and a surface layer section that covers the main body section, and at least part of the surface layer section is formed by at least one of ultra-hard alloy, cermet, ceramics and MCrAlY alloy.

DETAILED DESCRIPTION

Figure 1:
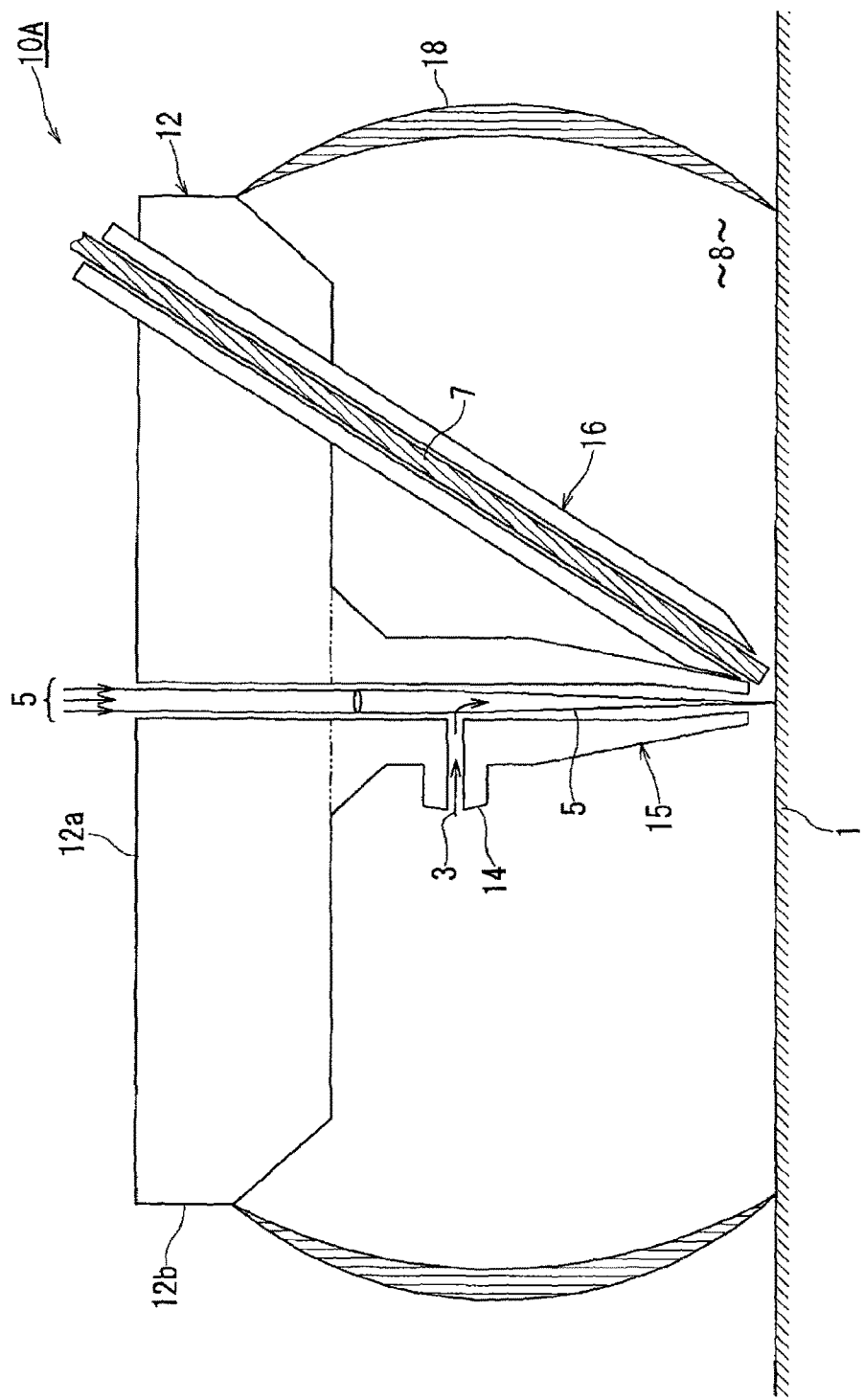
FIG. 1 is a sectional view illustrating configuration of first laser welding head.

Hereunder, the present embodiment will be described with reference to the accompanying drawings. The embodiment of the present invention provides a laser welding head capable of reducing an influence of the reflected light. It is noted that terms "upper", "lower", "right", "left" and the likes indicating direction illustrated in the accompanying drawings or in a case of actual usage. Further, in each FIGS. 1 to 4, common configuration will be designated by the same reference numerals and their duplicated explanation will be omitted.

FIG. 1 is a sectional view illustrating configuration of a laser welding head 10A (which will be referred to as "first laser welding head") which is first example of a laser welding head in accordance with the embodiment.

The first laser welding head 10A includes a shield gas injection nozzle 15 which irradiates laser light 5 onto a working surface which is a target of the laser welding 1 and which irradiates shielding gas 3 supplied from a shielding gas supply that is provided at a base unit 12 of the head to supply the shielding gas 3, and a welding wire supply nozzle 16 which supplies a welding wire 7 to the working surface 1.

Here, the working surface 1 is also a surface to be welded before the laser welding, and is also a welded surface after the laser welding. An upper end surface 12a is a surface of the end portion of the base unit 12, which portion is away from the working surface 1. An outer end surface 12b is a surface of the end portion of the base unit 12, which portion is away from the optical path side of the laser light 5.

Further, the first laser welding head 10A further includes a shielding gas cover 18 which forms an air space 8 by locally surrounding the working surface 1, thereby preventing external materials (for instance, gas such as air, and liquid such as water) from entering into the air space 8. The first laser welding head 10A provided with the shielding gas cover 18 can form the air space 8 locally surrounding the working surface 1, and hence can be applied not only to welding in air, but also to welding in water.

In the first laser welding head 10A, each of the shield gas injection nozzle 15 and the welding wire supply nozzle 16 is formed from material (which will be hereinafter referred to as "heat and wear resistant material") having heat resistance and wear resistance. Here, the heat and wear resistant material includes, for instance, at least one of ultra-hard alloy, cermet, ceramics and MCrAlY (here, M means nickel (Ni), cobalt (Co), iron (Fe) or alloy containing at least two of Ni, Co and Fe) alloy.

As for the heat and wear resistant material, ultra-hard alloy is composed of metal carbide selected from transition metals of the IV, V, VI group of a periodic table, such as titanium (Ti), vanadium (V), chromium (Cr), zirconium (Zr), niobium (Nb), molybdenum (Mo), hafnium (Hf), tantalum (Ta) and tungsten (W), or composed of the metal carbide such as tungsten carbide (WC) or tantalum carbide (TaC) and binder which is powder of an iron group element. Incidentally, the iron group element includes one or two kinds of iron (Fe), cobalt (Co) or nickel (Ni). Examples of ultra-hard alloy include tungsten carbide or tungsten carbide-cobalt-based alloy (WC—Co).

Further, cermet is a composite material composed of metallic material such as the iron group element or MCrAlY alloy and ceramics such as metal nitride, metal oxide or metal boride. Examples of cermet include MCrAlY cermet, titanium nitride (TiN), vanadium nitride (VN), zirconium nitride (ZrN), which contain the iron group element as binder. MCrAlY cermet is, for instance, composed of a top layer composed of ceramics such as yttria-partially stabilized zirconia, and a bond layer composed of metallic material such as MCrAlY alloy. Here, the top layer is the most surface side layer formed in the shield gas injection nozzle 15 and the welding wire supply nozzle 16, and the bond layer is formed between the top layer and base material constituting main body section of the shield gas injection nozzle 15 and the welding wire supply nozzle 16. Further, each layer of MCrAlY cermet can be formed by using forming method such as sintering method, thermal spraying and so on.

Furthermore, ceramics is an inorganic, nonmetallic solid material containing metal, nonmetal or metalloid atoms primarily held in ionic and covalent bonds. Examples of ceramics include metal oxide such as aluminum oxide (alumina: $Al_2O_3$), metal nitride such as aluminum nitride (AlN), sialon (SiAlON), silicon carbide (SiC), rare earth partially-stabilized zirconia such as yttria-partially stabilized zirconia, rare earth stabilized zirconia such as yttria-stabilized zirconia (YSZ).

In the first laser welding head 10A, the shield gas injection nozzle 15 and the welding wire supply nozzle 16 are configured by using at least one heat and wear resistant material such as ultra-hard alloy or ceramics. The first laser welding head 10A enables the shield gas injection nozzle 15 and the welding wire supply nozzle 16 to improve mechanical and thermal durability, and therefore prevents the shield gas injection nozzle 15 and the welding wire supply nozzle 16 from being damaged by melting, deformation or deficiency, even if the laser light irradiated onto the working surface 1 is reflected by the working surface 1.

As a result of preventing the shield gas injection nozzle 15 and the welding wire supply nozzle 16 from being damaged during the welding work, the first laser welding head 10A can suppress to deteriorate welding quality due to such influence that the shield gas injection nozzle 15 and the welding wire supply nozzle 16 are damaged by melting, deformation or deficiency, and can therefore maintain high welding quality. Further, since the shield gas injection nozzle 15 and the welding wire supply nozzle 16 has high mechanical and thermal durability, the first laser welding head 10A can reduce work time required for replacement and set-up change, as to the shield gas injection nozzle 15 and the welding wire supply nozzle 16.

Since the heat and wear resistant material is used not only in the shield gas injection nozzle 15 but also in the welding wire supply nozzle 16, the first laser welding head 10A can stably supply with the welding wire and can thereby prevent from deteriorating welding quality due to damage of the welding wire supply nozzle 16.

In the first laser welding head 10A described above, even though the shield gas injection nozzle 15 and the welding wire supply nozzle 16 are entirely formed of the heat and wear resistant material, the shield gas injection nozzle 15 and the welding wire supply nozzle 16 need not be necessarily entirely formed of the heat and wear resistant material. It is only necessary that at least the side (the side of the air space 8) of the surface irradiated with the reflected light of the laser light 5 (which will be hereinafter referred to as "surface layer section") is formed of the heat and wear resistant material.

Figure 2:
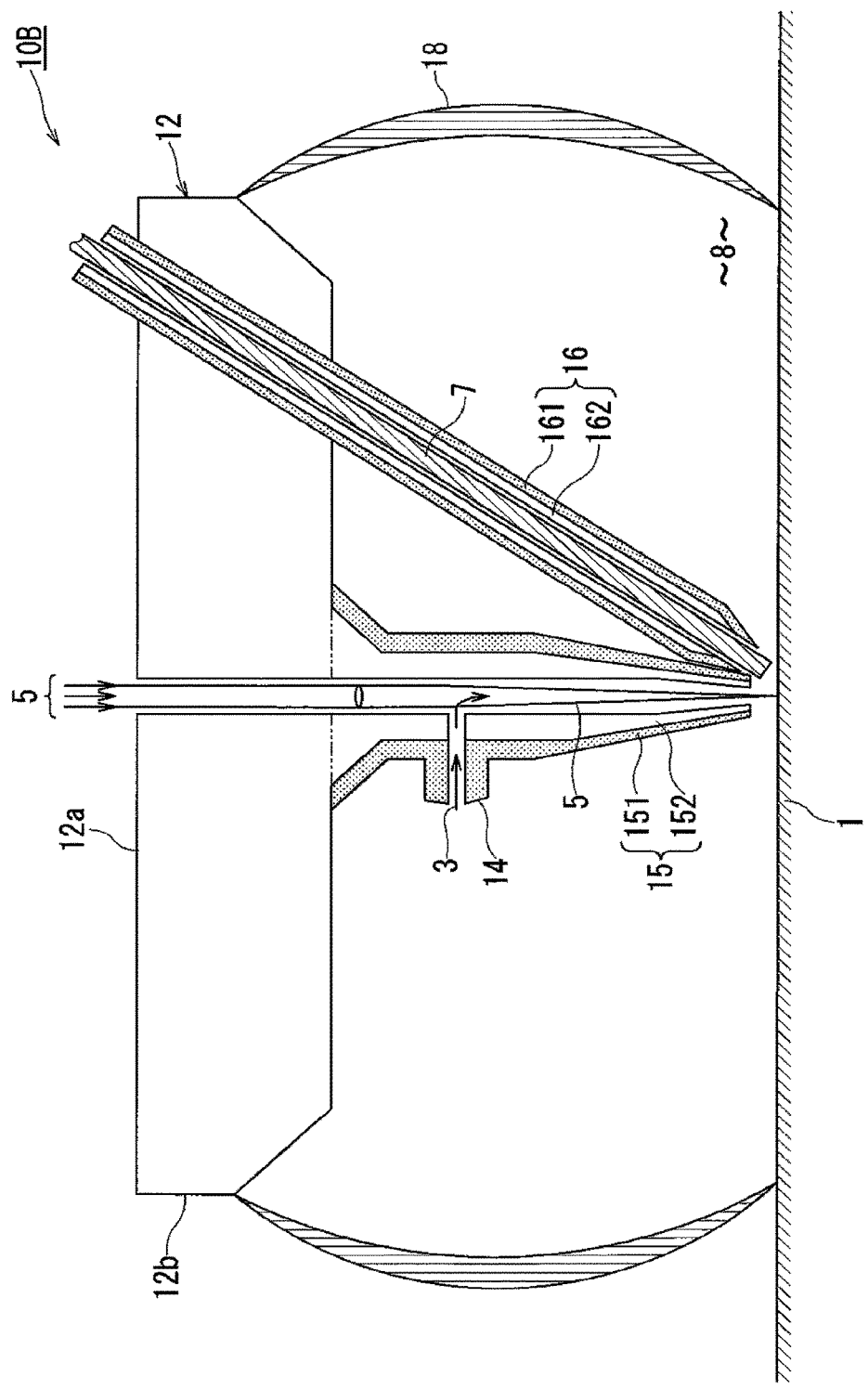
FIG. 2 is a sectional view illustrating configuration of second laser welding head.

FIG. 2 is a sectional view illustrating configuration of a laser welding head 10B (which will be referred to as "second laser welding head") which is second example of a laser welding head in accordance with the embodiment. In description of the second laser welding head 10B, the same reference numerals or characters in the second laser welding head 10B are assigned to the same or similar components and parts as those in the first laser welding head 10A, and the duplicated description thereof is omitted.

The second laser welding head 10B is different from the first laser welding head 10A in that the shield gas injection nozzle 15 and the welding wire supply nozzle 16 are respectively configured by surface layer sections 151 and 161 formed of the heat and wear resistant material and by main body sections 152 and 162 that are portions other than the surface layer sections 151 and 161. The surface layer section 151 is formed to cover an outer peripheral surface (outer periphery) of the main body section 152, and the surface layer section 161 is formed to cover an outer peripheral surface (outer periphery) the main body section 162.

In other words, if the main body sections 152 and 162 are formed of the same material (ultra-hard alloy, cermet, ceramics or MCrALY alloy) of that of the surface layer sections 151 and 161, the second laser welding head 10B has the same component as that of the first laser welding head 10A.

It is noted that the surface layer sections 151 and 161 may be, for instance, a film as a coating section, made of a single-layer or multi-layers formed using thermal spraying, or the like. When the surface layer sections 151 and 161 are made of multi-layers, the most surface side layer (top layer) is a layer formed of the heat and wear resistant material.

In the second laser welding head 10B, while any material, which is widely selected from commonly used materials, can be adopted for use in the main body sections 152 and 162, the main body section 152 is preferably formed of a material having higher thermal conductivity than that of the material of the surface layer section 151, and the main body section 162 is preferably formed of a material having higher thermal conductivity than that of the material of the surface layer section 161. For instance, if the main body section 152 is formed of the higher thermal conductivity material than that of the surface layer section 151, the main body section 152 performs as a heat dissipation section which dissipates heat received (absorbed) by the surface layer section.

In the second laser welding head 10B illustrated in FIG. 2, although both the shield gas injection nozzle 15 and the welding wire supply nozzle 16 respectively include the surface layer sections 151 and 161 formed of the heat and wear resistant material and the main body sections 152 and 162, either the shield gas injection nozzle 15 or the welding wire supply nozzle 16 may include the surface layer section 151 or 161 formed of the heat and wear resistant material and the main body section 152 or 162. For details, the main body section 152 may be integrally formed with the surface layer sections 151, or the main body section 162 may be integrally formed with the surface layer sections 161.

Figure 3:
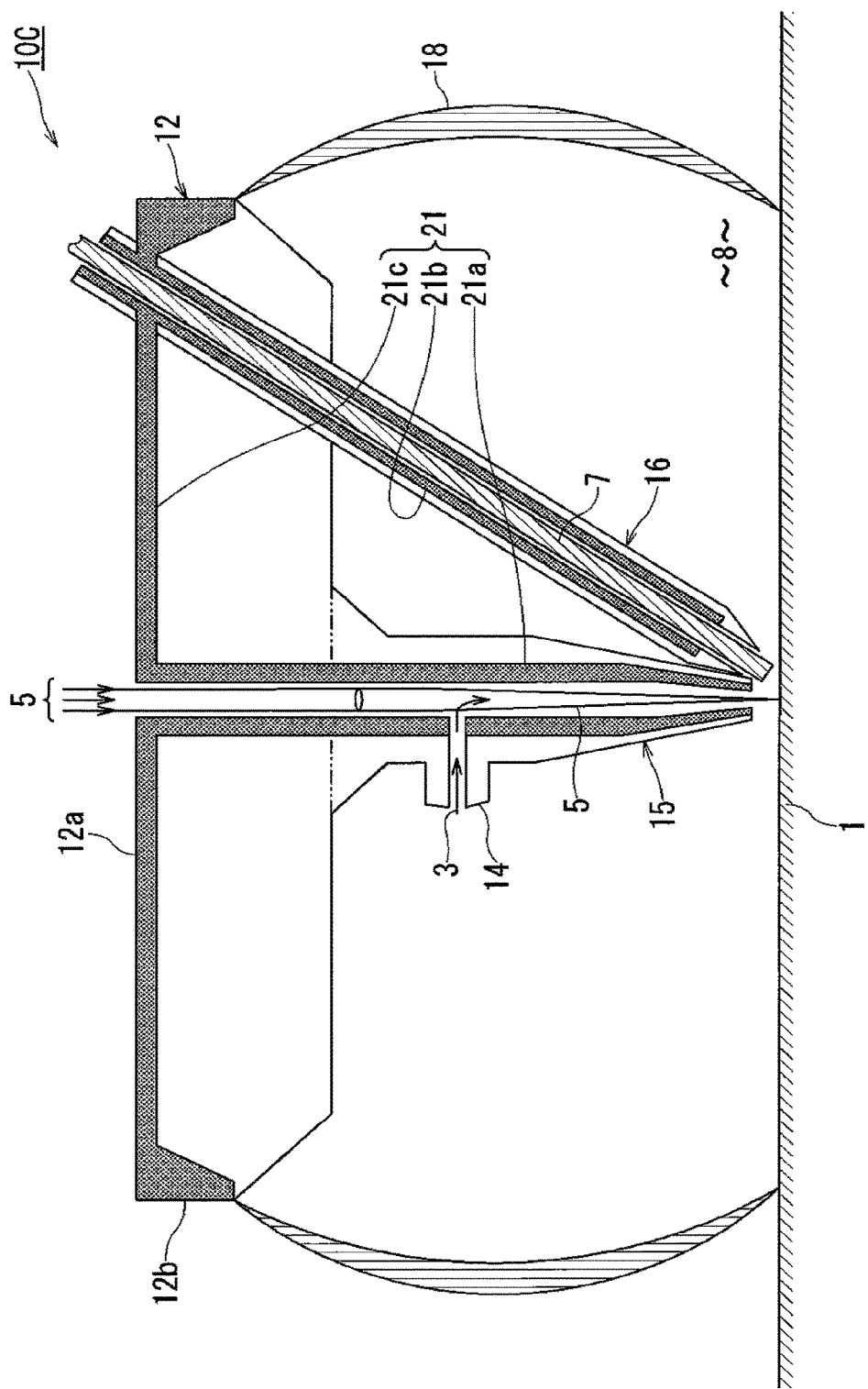
FIG. 3 is a sectional view illustrating configuration of third laser welding head.

FIG. 3 is a sectional view illustrating configuration of a laser welding head 10C (which will be referred to as "third laser welding head") which is third example of a laser welding head in accordance with the embodiment. In description of the second laser welding head 10C, the same reference numerals or characters in the first and second laser welding heads 10A and 10B are assigned to the same or similar components and parts as those in the first and second laser welding heads 10A and 10B, and the duplicated description thereof is omitted.

The third laser welding head 10C illustrated in FIG. 3 is different from the first laser welding head 10A in that a heat dissipation section 21 further provided to the shield gas injection nozzle 15 and the welding wire supply nozzle 16, the heat dissipation section 21 (which corresponds to first metal member 21a, second metal member 21b and third metal member 21c) dissipating heat absorbed by the shield gas injection nozzle 15 and the welding wire supply nozzle 16 from the shield gas injection nozzle 15 and the welding wire supply nozzle 16.

In the third laser welding head 10C, for instance, each of the first and second metal members 21a and 21b has a cylindrical shape being similar shape as a shape of the shield gas injection nozzle 15 and the welding wire supply nozzle 16. The first and second metal members 21a is attached on the inner peripheral surface (inner periphery) of the shield gas injection nozzle 15, and the second metal member 21b is attached on the inner peripheral surface of the welding wire supply nozzle 16.

For the purpose of increasing heat dissipation, it is preferred that the heat dissipation section 21 have higher thermal conductivity than that of component contacting with the heat dissipation section 21. That is, the first metal member 21a has higher thermal conductivity than a thermal conductivity of the shield gas injection nozzle 15, and the second metal member 21b has higher thermal conductivity than a thermal conductivity of the welding wire supply nozzle 16.

Furthermore, the third metal member 21c connected to the end portion sides of the first and second metal members 21a and 21b is attached on the upper end surface 12a of the base unit 12. In the third laser welding head 10C illustrated in FIG. 3, the first, second and third metal members 21a, 21b and 21c forms the dissipation section 21 and have a desired thickness to improve the thermal conductivity of the shield gas injection nozzle 15 and the welding wire supply nozzle 16.

Incidentally, although the third metal member 21c is not required to have a width (the length in the left-right direction in FIG. 3) enough to reach the outer end portion of the base unit 12, the third metal member 21c preferably has a width enough to reach the outer end portion of the base unit 12. If the third metal member 21c has a width enough to reach the outer end portion of the base unit 12, the third laser welding head 10C can use the outer end portion 12b as well as the upper end surface 12a as heat dissipation surfaces, and can therefore enhance heat dissipation effect.

Further, it is preferred that each of the both width-direction end portions of the third metal member 21c reach the outer end portion, and further the thickness of the outer end portion of the third metal member 21c (the vertical length at each of the both left-right-direction end portions of the base unit 12 in FIG. 3) is larger than the thickness at the center portion of the third metal member 21c. If the thickness of the outer end portion of the third metal member 21c is larger than the thickness at the center portion of the third metal member 21c, the third laser welding head 10C can further enlarge the heat dissipation surface, and can thereby enhance heat dissipation effect.

Incidentally, although the third laser welding head 10C illustrated in FIG. 3 is an example of the third laser welding head 10C configured by further providing the heat dissipation section 21 to the nozzles 15 and 16 in the first laser welding head 10A, the heat dissipation section 21 may be provided to the nozzles 15 and 16 in the first laser welding head 10B instead of the first laser welding head 10A.

Figure 4:
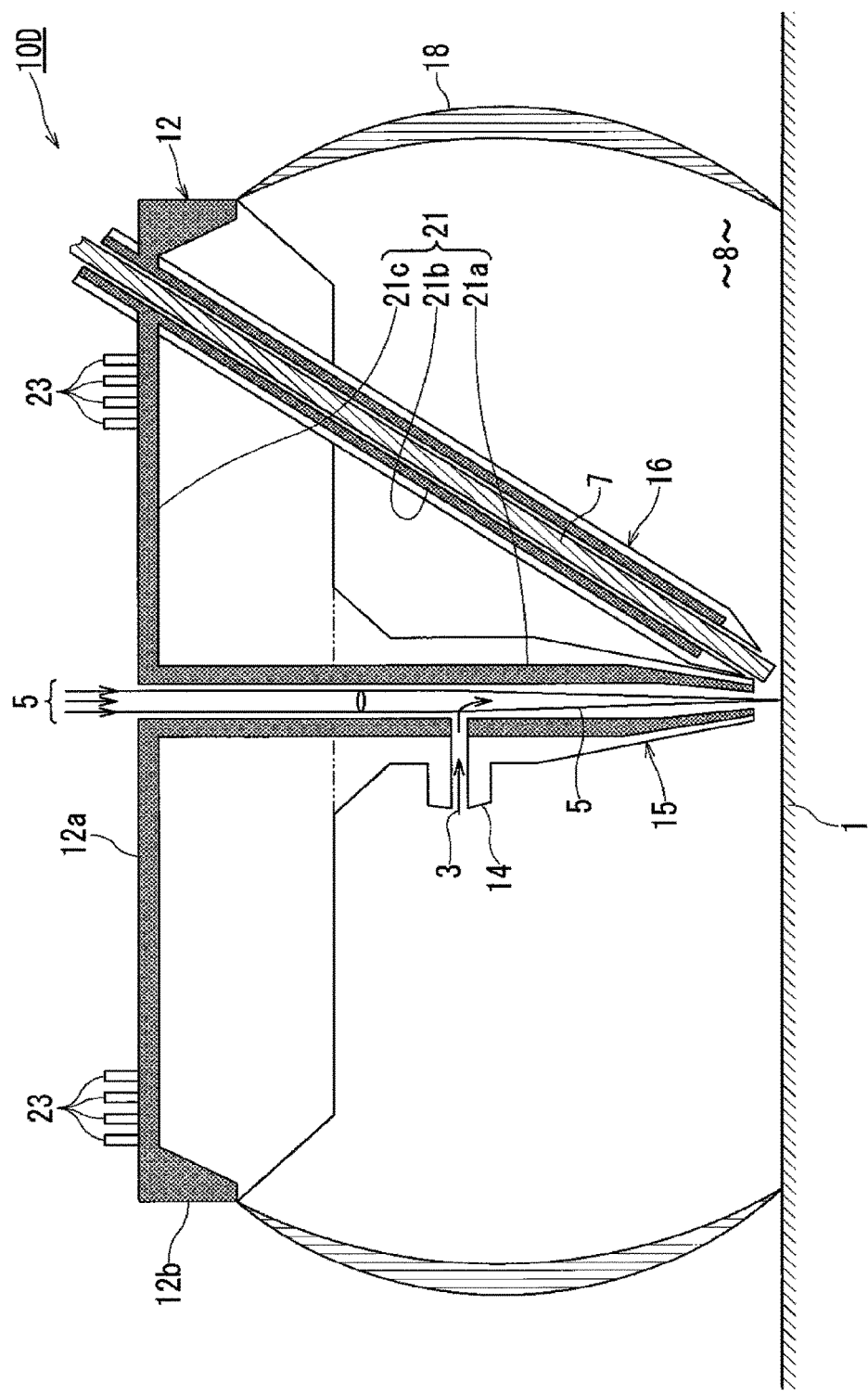
FIG. 4 is a sectional view illustrating configuration of fourth laser welding head.

FIG. 4 is a sectional view illustrating configuration of a laser welding head 10D (which will be referred to as "fourth laser welding head") which is fourth example of a laser welding head in accordance with the embodiment.

As illustrated in FIG. 4, heat dissipation fins 23 can be attached on the surface of the third metal member 21c.

The first, second and third metal members 21a, 21b and 21c may also be formed of heatsink material such as a copper alloy, an aluminum alloy, a base metal or alloy of gold or silver. The heatsink material can be selected in consideration of the thermal conductivity of the shield gas injection nozzle 15 and the welding wire supply nozzle 16, required dissipation efficiency of the shield gas injection nozzle 15 and the welding wire supply nozzle 16 or the like.

The first and second metal members 21a and 21b may be configured to be mechanically coupled with the heat and wear resistant material such as ultra-hard alloy, constituting (forming) the shield gas injection nozzle 15 and the welding wire supply nozzle 16, or may be configured to adhere to the shield gas injection nozzle 15 and the welding wire supply nozzle 16 by vapor deposition or thermal spraying so as to have a desired thickness. On the contrary, the heat and wear resistant material forming the shield gas injection nozzle 15 and the welding wire supply nozzle 16 may also be made to adhere to the first, second and third metal members 21a, 21b and 21c by thermal spraying.

In the case where the first and second metal members 21a and 21b are attached on the inner peripheral surface of the material forming the shield gas injection nozzle 15 and the welding wire supply nozzle 16, even if the shield gas injection nozzle 15 and the welding wire supply nozzle 16 are affected by the heat of the laser reflected light, the third laser welding head 10C can dissipate to outside via the first and second metal members 21a and 21b. Since the end portions of the first metal members 21a and 21b are further connected to the third metal member 21c contact with outside, the third laser welding head 10C can enhance heat dissipation effect.

Further, since each of the first, second and third metal members 21a, 21b and 21c is formed of a metal plate and thereby has adequate thickness, the heat conduction can be significantly improved as compared with the case where each of the first, second and third metal members 21a, 21b and 21c is formed of a thin metal material such as metal sheet. Here, said adequate thickness is a thickness which can be considered as "plate", the thickness being thicker than approximately 6 mm.

There is first case where the width of the third metal member 21c is set so that the third metal member 21c can reach the outer end portion of the base unit 12. In the first case, since the surface in contact with the outside, i.e., the heat dissipation surface can be increased, the heat dissipation effect can be enhanced. There is second case where the width of the third metal member 21c is set to set so that the third metal member 21c can reach the outer end portion of the base unit 12, and the thickness of each of the outer end portions of the third metal member 21c is made larger than the thickness of the center portion of the third metal member 21c. In the second case, since the heat dissipation surface can be further increased, the heat dissipation effect can be further enhanced.

If the heat dissipation fins 23 are provided on the third metal member 21c, the heat dissipation effect can be still further enhanced.

As described above, the influence of heat generated in the shield gas injection nozzle 15 and the welding wire supply nozzle 16 can be dissipated to the outside of the shield gas injection nozzle 15 and the welding wire supply nozzle 16 via the first and second metal members 21a and 21b, and also can be dissipated to the outside of the third laser welding head 10C or the fourth laser welding head 10D via the third metal member 21c. Accordingly, the third laser welding head 10C and the fourth laser welding head 10D can prevent that the temperature of the shield gas injection nozzle 15 and the welding wire supply nozzle 16 is increased, and can thereby protect the shield gas injection nozzle 15 and the welding wire supply nozzle 16 from any damages such as melting, deformation or deficiency.

Since the embodiments described above are presented as examples, there is no intention to limit the scope of the invention. These novel embodiments can be practiced in other various aspects, and thus various omissions, replacements, modifications, and combinations may be made within a range without departing from the essence of the invention in consideration of common general technical knowledge of a person skilled in the art. These embodiments and their variations are included in the scope and essence of the invention as well as in a range equal to that of the invention described in Claims.

What is claimed is:

1. A laser welding head including a base unit thereof comprising:
   a shield gas injection nozzle that is provided to the base unit, irradiates laser light onto a target, and supplies a shielding gas to the target;
   a welding wire supply nozzle that is provided to the base unit and supplies a welding wire to the target, and
   a shielding gas cover which forms an air space by locally surrounding the target and wherein the laser welding head is configured for use in water, and each of the shield gas injection nozzle and the welding wire supply nozzle includes a main body section and a surface layer section that covers the main body section, and the surface layer section in the air space is entirely formed by at least one material selected from alloy composed of at least one metal carbide where the metal is selected from transition metals of the IV, V, VI group of the periodic table; cermet; ceramics; and MCrAlY alloy, wherein the surface layer section covers an entirety of the main body section in the air space, and the main body section extends from the base unit into the air space.

2. The laser welding head comprising according to claim 1, wherein the surface layer section has a coating section composed of a first layer that is formed by the at least one material.

3. The laser welding head comprising according to claim 1, wherein the surface layer section has a coating section composed of multiple layers including a top layer located in a direction away from the main body section, the top layer being formed by the at least one material.

4. The laser welding head comprising according to claim 1, wherein the main body section is integrally formed with the surface layer section, and
   wherein each of the shield gas injection nozzle and the welding wire supply nozzle, of which the main body section is integrally formed with the surface layer section, is formed by the same material as that of the surface layer section.

5. The laser welding head comprising according to claim 1, further comprising a heat dissipation section including a first metal member attached on an inner peripheral surface of the shield gas injection nozzle, a second metal member attached on an inner peripheral surface of the welding wire supply nozzle, and a third metal member arranged on a side away from the shield gas injection nozzle, the third metal member being connected with the first and second metal members.

6. The laser welding head comprising according to claim 5, wherein the third metal member has a width which reaches to a side end of the base unit.

7. The laser welding head comprising according to claim 5, wherein the first metal member attached on the inner peripheral surface of the shield gas injection nozzle has a thermal conductivity being higher than a thermal conductivity of the shield gas injection nozzle, and wherein the second metal member attached on an inner peripheral surface of the welding wire supply nozzle has a thermal conductivity being higher than a thermal conductivity of the welding wire supply nozzle.

8. The laser welding head comprising according to claim 5, further comprising fins attached on the third metal member.

9. The laser welding head comprising according to claim 1, wherein the alloy is composed of at least one metal carbide selected from transition metals of the IV, V, VI group of a periodic table, and any one or two of iron, cobalt and nickel.

10. The laser welding head comprising according to claim 1, wherein the cermet is a composite material composed of metallic material containing any one or two of iron, cobalt and nickel, and ceramics.

11. The laser welding head comprising according to claim 1, wherein the cermet is composed of:
    a top layer that is located in a direction away from the main body section and is formed by ceramics; and
    a bond layer that is formed between the top layer and the main body section and is formed by metallic material.

12. The laser welding head comprising according to claim 1, wherein the ceramics includes any one of aluminum oxide, aluminum nitride, sialon, silicon carbide, rare earth partially-stabilized zirconia and rare earth stabilized zirconia.

* * * * *